United States Patent
Yokoyama et al.

(10) Patent No.: US 11,869,347 B2
(45) Date of Patent: Jan. 9, 2024

(54) TRAFFIC MONITORING SYSTEM AND TRAFFIC MONITORING METHOD

(71) Applicant: Panasonic Corporation, Osaka (JP)

(72) Inventors: Yoji Yokoyama, Kanagawa (JP); Makoto Yasugi, Tokyo (JP)

(73) Assignee: PANASONIC HOLDINGS CORPORATION, Osaka (JP)

(*) Notice: Subject to any disclaimer, the term of this patent is extended or adjusted under 35 U.S.C. 154(b) by 676 days.

(21) Appl. No.: 17/044,619

(22) PCT Filed: Mar. 29, 2019

(86) PCT No.: PCT/JP2019/013925
§ 371 (c)(1),
(2) Date: Oct. 1, 2020

(87) PCT Pub. No.: WO2019/194084
PCT Pub. Date: Oct. 10, 2019

(65) Prior Publication Data
US 2021/0104154 A1    Apr. 8, 2021

(30) Foreign Application Priority Data
Apr. 4, 2018 (JP) .................. 2018-072542

(51) Int. Cl.
*G01S 13/86* (2006.01)
*G08G 1/01* (2006.01)
(Continued)

(52) U.S. Cl.
CPC .............. *G08G 1/01* (2013.01); *G01S 13/867* (2013.01); *G01S 13/91* (2013.01); *G06T 11/60* (2013.01); *G08G 1/04* (2013.01)

(58) Field of Classification Search
CPC .................................................. G01S 13/867
See application file for complete search history.

(56) References Cited

U.S. PATENT DOCUMENTS

| 11,543,513 B2 * | 1/2023 | Sutou | G08G 1/16 |
| 2005/0213794 A1 * | 9/2005 | Horibe | B60R 1/00 382/104 |

(Continued)

FOREIGN PATENT DOCUMENTS

| CN | 105339061 | 2/2016 |
| CN | 106908783 | 6/2017 |

(Continued)

OTHER PUBLICATIONS

English language translation of Search Report, which is an annex to an Office Action from China National Intellectual Property Administration (CNIPA) in Chinese Patent Application No. 201980024460.9, dated Jul. 12, 2022.

(Continued)

*Primary Examiner* — Matthew Salvucci
(74) *Attorney, Agent, or Firm* — Greenblum & Bernstein, P.L.C.

(57) ABSTRACT

The traffic monitoring system is provided with: a camera which captures an image of a monitoring area including a road and generates image data; a millimeter-wave radar which scans a scanning area included in the monitoring area and generates millimeter-wave data; and an information processing server which is connected to the camera and the millimeter-wave radar and acquires the image data and the millimeter-wave data. The information processing server is provided with: a data synchronization unit which synchronizes the image data with the millimeter-wave data so that the difference between a timing at which the image data is generated and a timing at which the millimeter-wave data is generated is equal to or smaller than a certain value; and a screen generation unit which associates the image data and the millimeter wave, which have been synchronized, with (Continued)

each other and generates a monitoring screen that indicates the road conditions.

5 Claims, 8 Drawing Sheets

(51) Int. Cl.
*G01S 13/91* (2006.01)
*G06T 11/60* (2006.01)
*G08G 1/04* (2006.01)

(56) References Cited

U.S. PATENT DOCUMENTS

| | | | |
|---|---|---|---|
| 2015/0278608 | A1 | 10/2015 | Matsumoto et al. |
| 2015/0326829 | A1 | 11/2015 | Kurihara et al. |
| 2018/0359449 | A1 | 12/2018 | Matsumoto et al. |

FOREIGN PATENT DOCUMENTS

| | | |
|---|---|---|
| JP | 2002-260166 | 9/2002 |
| JP | 2004-102545 | 4/2004 |
| JP | 2005-338941 | 12/2005 |
| JP | 2007-257536 | 10/2007 |
| JP | 2015-186202 | 10/2015 |
| JP | 2017-098879 | 6/2017 |
| WO | 2015/152304 | 10/2015 |

OTHER PUBLICATIONS

International Search Report (ISR) from International Searching Authority (Japan Patent Office) in International Pat. Appl. No. PCT/JP2019/013925, dated Jul. 2, 2019, along with an English language translation thereof.

\* cited by examiner

TRAFFIC MONITORING SYSTEM AND TRAFFIC MONITORING METHOD

TECHNICAL FIELD

The present disclosure relates to a traffic monitoring system and a traffic monitoring method.

BACKGROUND ART

Conventionally, traffic monitoring systems that monitor movement of vehicles including bicycles and of pedestrians have been introduced on roads such as intersections. In traffic monitoring systems, it is desirable that road conditions and/or a hazard alert be notified efficiently by detecting vehicles and pedestrians (hereafter, each referred to as a moving body) accurately and without omission.

For example, Patent Literature (hereinafter, referred to as "PTL") 1 discloses a method in which road condition images corresponding to each predetermined section of a road are generated based on images captured by a monitoring camera, and are displayed with predetermined display colors.

Further, for example, PTL 2 discloses a device that measures running vehicles by a millimeter-wave radar, and monitors vehicle traffic while automatically judging the number of lanes, each lane width, median strip widths, and the like.

CITATION LIST

Patent Literature

PTL 1
Japanese Patent Application Laid-Open No. 2004-102545
PTL 2
Japanese Patent Application Laid-Open No. 2007-257536

SUMMARY OF INVENTION

Technical Problem

However, a traffic monitoring system in which two sensor devices, that is, a camera and a radar, are combined and road conditions are monitored accurately and efficiently has not been sufficiently taken into consideration.

One non-limiting and exemplary embodiment of the present disclosure facilitates providing a traffic monitoring system and a traffic monitoring method in which two sensor devices, that is, a camera and a radar, are combined and road conditions are monitored accurately and efficiently.

A traffic monitoring system according to an embodiment of the present disclosure includes: a camera that captures a monitoring area including a road, and generates image data; a millimeter-wave radar that scans a scanning area included in the monitoring area, and generates millimeter-wave data; and an information processing server that is connected to the camera and the millimeter-wave radar, and acquires the image data and the millimeter-wave data, wherein the information processing server includes: a data synchronizer that synchronizes the image data and the millimeter-wave data such that a difference between a timing at which the image data is generated and a timing at which the millimeter-wave data is generated is equal to or smaller than a certain value; and a screen generator that associates the image data and the millimeter-wave data which have been synchronized, with each other, and generates a monitoring screen that indicates a condition of the road.

A traffic monitoring method according to an embodiment of the present disclosure includes: acquiring image data from a camera, the image data being generated by capturing a monitoring area including a road; acquiring millimeter-wave data from a millimeter-wave radar, the millimeter-wave data being generated by scanning a scanning area included in the monitoring area; synchronizing the image data and the millimeter-wave data such that a difference between a timing at which the image data is generated and a timing at which the millimeter-wave data is generated is equal to or smaller than a certain value; and associating the image data and the millimeter-wave data which have been synchronized, with each other, and generating a monitoring screen that indicates a condition of the road.

It should be noted that general or specific embodiments may be implemented as a system, an integrated circuit, a computer program or a storage medium, or may be implemented as any combination of a system, an apparatus, a method, an integrated circuit, a computer program, and a storage medium.

An embodiment of the present disclosure facilitates providing a traffic monitoring system and a traffic monitoring method in which two sensor devices, that is, a camera and a radar, are combined and road conditions are monitored accurately and efficiently.

Additional benefits and advantages of the disclosed embodiment will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Hereinafter, an embodiment of the present disclosure will be described in detail with reference to the accompanying drawings as appropriate. However, more detailed description than necessary may be omitted. For example, detailed descriptions of already well-known matters and repeated descriptions for substantially the same configuration may be omitted. This is to prevent the following description from becoming unnecessarily redundant and to facilitate understanding by those skilled in the art.

Note that, the accompanying drawings and the following description are provided so that those skilled in the art understand the present embodiment sufficiently, and are not intended to limit the subject matters recited in the claims.

Embodiment

<Configuration of Traffic Monitoring System>

Figure 1:
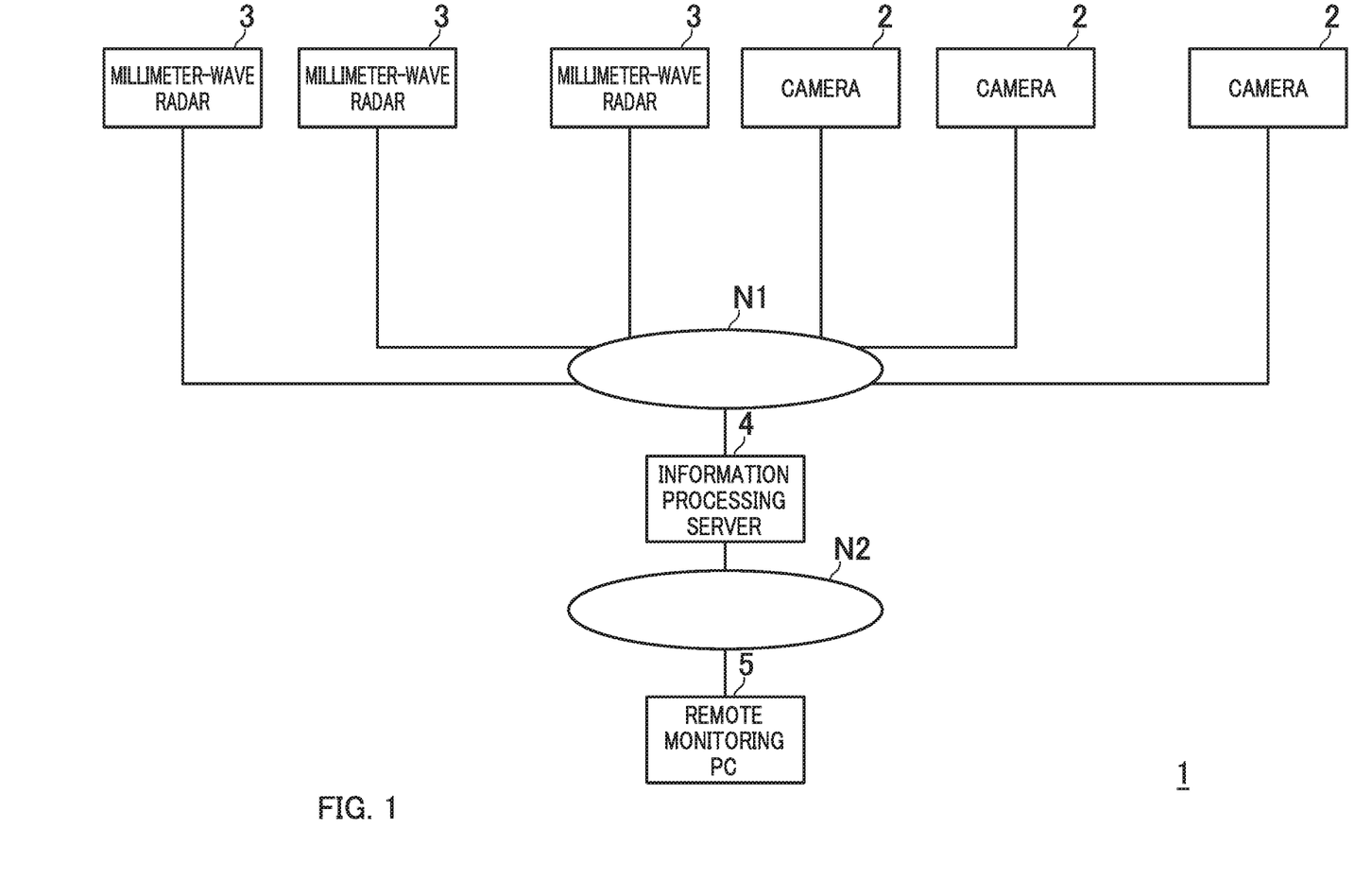
FIG. 1 illustrates an example of a configuration of a traffic monitoring system according to an embodiment of the present disclosure.

FIG. 1 illustrates an example of a configuration of traffic monitoring system 1 according to the present embodiment. Traffic monitoring system 1 includes a plurality of cameras 2, a plurality of millimeter-wave radars 3, information processing server (control apparatus) 4, and a remote monitoring personal computer (PC) 5. In the present embodiment, a traffic monitoring system in which traffic of a road where vehicles, pedestrians, or the like pass is monitored will be described as an example.

Camera 2 and millimeter-wave radar 3 are connected to information processing server 4 through network N1. Network N1 may be a wireless network, a wired network, or a combination thereof.

Information processing server 4 is connected to remote monitoring PC 5 through network N2. Network N2 may be a wireless network, a wired network, or a combination thereof.

Camera 2 is provided, for example, above a structure (for example, a pole on which a road sign is installed) on a periphery of the road. Camera 2 captures an area on the periphery of the road, which includes the road. Note that, the area on the periphery of the road, which is in a capturing range of camera 2 and includes the road, may also be described as a monitoring area.

Camera 2 generates data of an image (image data) captured thereby, and transmits the captured image data to information processing server 4. The image data to be transmitted includes time information indicating a timing (for example, a time) at which the image data is generated. Note that, the time indicated by the time information may also be a time when camera 2 performs capturing. Further, for example, camera 2 may also transmit the image data in frame units to information processing server 4. Further, the image captured by camera 2 may also be described as a camera image. Further, for example, a coordinate system defining horizontal and vertical directions of the camera image may be described as a camera coordinate system. The camera coordinate system is defined, for example, based on a position where camera 2 is installed, an orientation of camera 2, and a viewing angle of the camera.

Millimeter-wave radar 3 is provided, for example, above a structure on a periphery of the road. Millimeter-wave radar 3 transmits a radar signal in the millimeter-wave band to the periphery of the road, and receives a reflected signal that is the radar signal reflected by an object on the periphery of the road. Note that, millimeter-wave radar 3 scans the periphery of the road by sequentially transmitting radar signals in a plurality of directions. A range in which millimeter-wave radar 3 scans radar signals may also be described as a scanning area.

Millimeter-wave radar 3 generates, for example, millimeter-wave data based on information on at least one of a time between a time when a radar signal is transmitted and a time when a reflected signal is received, a direction in which a radar signal is transmitted, a reception intensity of a reflected signal, and a Doppler frequency of a reflected signal.

Millimeter-wave data includes, for example, information indicating an object on the periphery of the road, which has reflected a radar signal (hereinafter, the object will be referred to as a reflection object). For example, millimeter-wave data is data including a set of points indicating a position of a reflection object (hereinafter, each of the points will be referred to as a reflection point) in a coordinate system defined by using a position of millimeter-wave radar 3 as a reference. The coordinate system defined by using a position of millimeter-wave radar 3 as a reference is, for example, a polar coordinate system in which each point on a plane is determined by a distance from a position of millimeter-wave radar 3 and an azimuth at which millimeter-wave radar 3 performs scanning. Note that, the coordinate system defined by using a position of millimeter-wave radar 3 as a reference may also be described as a millimeter-wave radar coordinate system. The millimeter-wave radar coordinate system is defined, for example, based on a position millimeter-wave radar 3, an orientation of millimeter-wave radar 3, and a scanning area (detection range) of millimeter-wave radar 3.

Note that the reflection point is not limited to one reflection point with respect to one reflection object. In millimeter-wave data, one reflection object may be represented by a plurality of reflection points.

Further, examples of the reflection object include vehicles and pedestrians (hereinafter, each referred to as a moving body) that travel on the periphery of the road, and structures provided on the periphery of the road (road signs, signals, or the like; hereinafter, each structure will be referred to as a stationary object). Millimeter-wave data may include a reflection point indicating a position of a moving body, and a reflection point indicating a position of a stationary object.

Millimeter-wave radar 3 transmits millimeter-wave data to information processing server 4. The millimeter-wave data to be transmitted includes time information indicating a timing (for example, a time) at which the millimeter-wave data is generated. Note that, the time indicated by the time information may also be a time when a radar signal for generating the millimeter-wave data is transmitted, or a time when a radar signal is received. Further, millimeter-wave radar 3 may scan a scanning area at a set period and transmit the millimeter-wave data to information processing server 4.

The timing at which camera 2 generates image data and the timing at which millimeter-wave radar 3 generates millimeter-wave data may not coincide, and may be different from each other. Further, the timing at which camera 2 transmits image data and the timing at which millimeter-wave radar 3 transmits millimeter-wave data may not coincide, and may be different from each other. For example, a frequency at which camera 2 generates image data is higher than a frequency at which millimeter-wave radar 3 generates millimeter-wave data.

Note that, camera 2 and millimeter-wave radar 3 may be installed in the same structure or in structures different from each other. Further, camera 2 and millimeter-wave radar 3 may be provided in the same housing or in separate housings.

Further, methods for installing camera 2 and millimeter-wave radar 3, places where camera 2 and millimeter-wave radar 3 are installed, and a relative positional relationship between camera 2 and millimeter-wave radar 3 are not limited. Further, a positional relationship between the monitoring area of camera 2 and the scanning area of millimeter-wave radar 3 is not limited. In the present disclosure, camera 2 and millimeter-wave radar 3 are preferably installed such that the scanning area of millimeter-wave radar 3 is included in the monitoring area of camera 2.

For example, at least one camera 2 and at least one millimeter-wave radar 3 are paired and provided at one point where monitoring is performed (hereinafter, the point will be referred to as a monitoring point). Note that, at one monitoring point, two or more cameras 2 may be provided and/or two or more millimeter-wave radars 3 may be provided.

Information processing server 4 is connected to camera 2 and millimeter-wave radar 3, which are provided at each of a plurality of monitoring points, through network N1. Information processing server 4 acquires image data from camera 2, and acquires millimeter-wave data from millimeter-wave radar 3. Further, information processing server 4 generates a monitoring screen related to road conditions at the monitoring point based on the image data and the millimeter-wave data. Information processing server 4 transmits data of the generated monitoring screen to remote monitoring PC 5 through network N2.

Note that, information processing server 4 may receive instruction information including a setting related to the monitoring screen and/or an instruction related to a monitoring point, from remote monitoring PC 5. In this case, information processing server 4 generates a monitoring screen based on the instruction information.

Remote monitoring PC 5 receives the data of the monitoring screen from information processing server 4 through network N2. Remote monitoring PC 5 processes the data of the monitoring screen, and displays the monitoring screen on a display (not illustrated).

Note that, remote monitoring PC 5 may receive a setting related to the monitoring screen and/or an instruction related to a monitoring point from a user through an operator (not illustrated), for example. In this case, remote monitoring PC 5 may transmit instruction information including the setting related to the monitoring screen and/or the instruction related to a monitoring point to information processing server 4.

Note that, although FIG. 1 illustrates one remote monitoring PC5, there may be a plurality of remote monitoring PCs 5. Further, although FIG. 1 illustrates networks N1 and N2, networks N1 and N2 may be the same network or different networks. Further, although an example has been described in which information processing server 4 is connected to camera 2 and millimeter-wave radar 3 through network N1, information processing server 4 may be connected to camera 2 and/or millimeter-wave radar 3 directly by a wired or wireless connection, not through network N1. Further, remote monitoring PC 5 may be connected to information processing server 4 directly by a wired or wireless connection, not through network N2.

In traffic monitoring system 1 described above, in a case where a user who performs monitoring inputs (or selects) a specific monitoring point through the operator of remote monitoring PC 5, for example, remote monitoring PC 5 transmits instruction information indicating the input (or selected) monitoring point to information processing server 4.

Information processing server 4 generates a monitoring screen related to road conditions at the monitoring point indicated by the instruction information. Information processing server 4 then transmits data of the generated monitoring screen to remote monitoring PC 5 that is the transmission source of the instruction information.

<Configuration of Information Processing Server>

Figure 2:
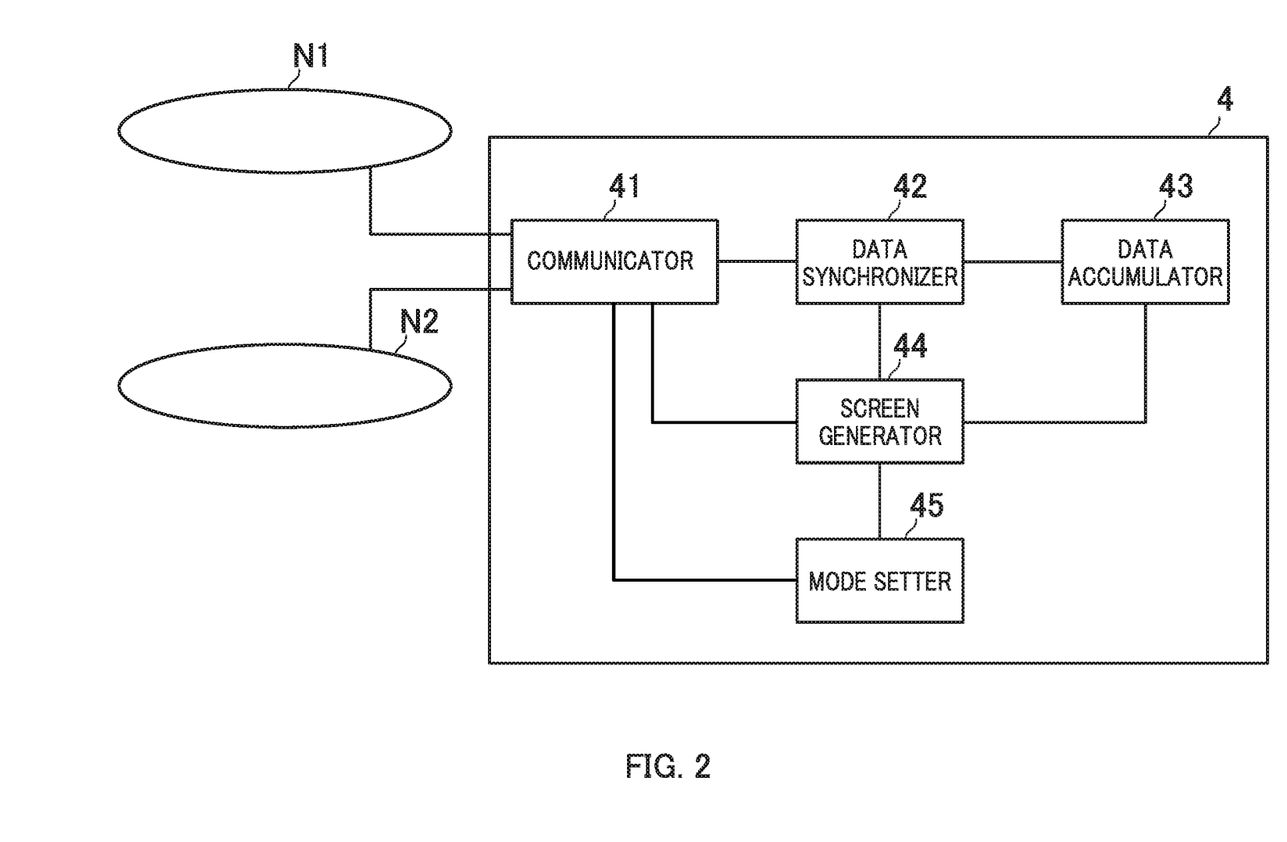
FIG. 2 illustrates an example of a configuration of an information processing server according to the embodiment of the present disclosure.

Next, an example of a configuration of information processing server 4 will be described. FIG. 2 illustrates an example of a configuration of information processing server 4 according to the present embodiment.

For example, information processing server 4 includes communicator 41, data synchronizer 42, data accumulator 43, screen generator 44, and mode setter 45.

Communicator 41 is an interface for communication with camera 2 and millimeter-wave radar 3 through network N1. Further, communicator 41 is an interface for communication with remote monitoring PC 5 through network N2.

Data synchronizer 42 acquires image data from camera 2 through communicator 41. Further, data synchronizer 42 acquires millimeter-wave data from millimeter-wave radar 3 through communicator 41.

Data synchronizer 42 synchronizes the image data and the millimeter-wave data. For example, data synchronizer 42 adjusts a timing at which the image data is generated and a timing at which the millimeter-wave data is generated, based on time information included in the image data and time information included in the millimeter-wave data.

For example, for image data of one frame, data synchronizer 42 selects such millimeter-wave data that a time difference between a time indicated by time information included in the image data and a time indicated by time information included in the millimeter-wave data is equal to or smaller than a predetermined value, and associates the selected millimeter-wave data with the image data of the one frame. Alternatively, for image data of one frame, data synchronizer 42 may select millimeter-wave data including time information indicating a time closest to a time indicated by time information included in the image data, and associate the selected millimeter-wave data with the image data of the one frame.

Note that, for example, in a case where the frequency at which camera 2 generates image data and a frequency at which millimeter-wave radar 3 generates millimeter-wave data are different, data synchronizer 42 may perform data synchronization so as to associate one image data with two different millimeter-wave data. Alternatively, data synchronizer 42 may perform data synchronization so as to associate one millimeter-wave data with two different image data. Data synchronizer 42 associates the image data and the millimeter-wave data with each other, in which the times indicated by each time information are included within a predetermined time.

Data synchronizer 42 outputs the synchronized data to data accumulator 43. Further, data synchronizer 42 outputs the synchronized data to screen generator 44.

Data accumulator 43 accumulates the image data and the millimeter-wave data which have been synchronized by data synchronizer 42, in association with each other. Data accumulator 43 accumulates the image data and the millimeter-wave data in time series based on the time information, for example. Further, data accumulator 43 may accumulate image data and millimeter-wave data of each of the plurality of monitoring points.

Screen generator 44 acquires the image data and the millimeter-wave data which have been synchronized (whose timings have been adjusted), from data synchronizer 42. Further, screen generator 44 may acquire instruction information including a setting related to the monitoring screen and/or an instruction related to a monitoring point from remote monitoring PC 5 through communicator 41.

Screen generator 44 then associates the image data and the millimeter-wave data which have been synchronized (whose timings have been adjusted), with each other, and generates a monitoring screen that indicates road conditions.

For example, screen generator 44 performs signal processing (for example, clustering processing) to millimeter-wave data of millimeter-wave radar 3 provided at a monitoring point indicated by instruction information, and estimates a region corresponding to a reflection object. The estimated region is an example of millimeter-wave data information.

Further, screen generator 44 performs conversion such that millimeter-wave data corresponding to a scanning area corresponds to a monitoring area. For example, screen generator 44 may perform coordinate conversion processing in which millimeter-wave data information defined by the millimeter-wave radar coordinate system is converted into that of the camera coordinate system. Screen generator 44 superimposes millimeter-wave data information after the coordinate conversion on an image indicated by image data.

Further, screen generator 44 may perform signal processing in accordance with a mode instructed by mode setter 45, and generate a monitoring screen in accordance with the mode. Note that, examples of the mode and the monitoring screen in accordance with the mode will be described later.

Screen generator 44 then transmits data of the generated monitoring screen to remote monitoring PC 5. Note that, screen generator 44 may transmit the millimeter-wave data used for generating the data of the monitoring screen to remote monitoring PC5.

Note that, screen generator 44 may also generate a monitoring screen by using data accumulated in data accumulator 43.

Mode setter 45 acquires instruction information through communicator 41.

Mode setter 45 instructs a mode related to the monitoring screen, which is included in the instruction information, to screen generator 44.

<Processing Flow in Information Processing Server>

Next, an example of a processing flow to be executed in information processing server 4 will be described with reference to FIG. 3.

Figure 3:
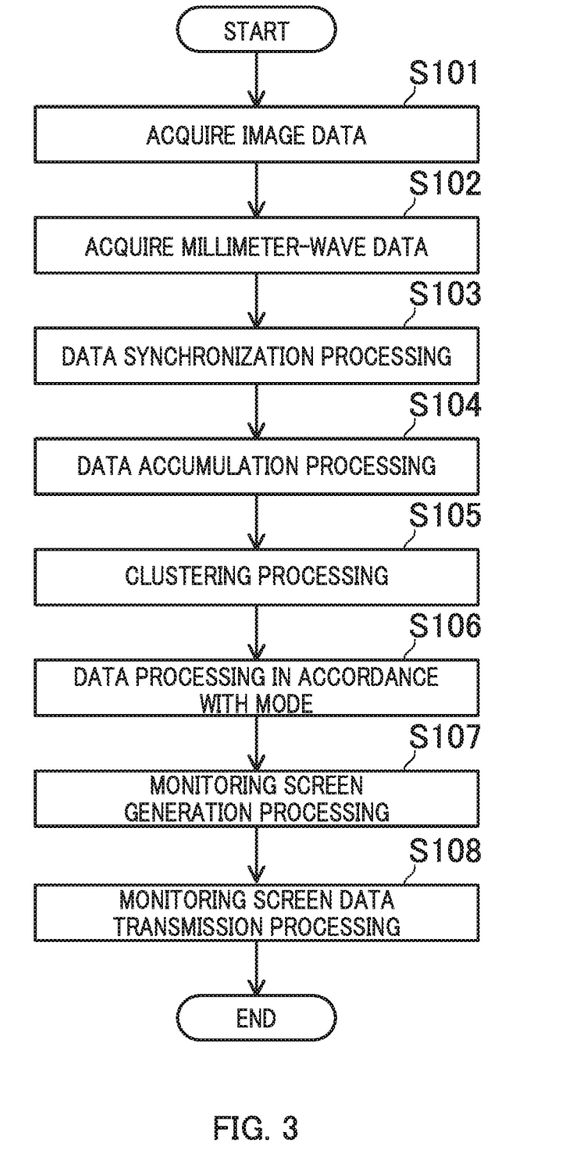
FIG. 3 is a flowchart illustrating an example of processing of the information processing server according to the embodiment of the present disclosure.

FIG. 3 is a flowchart illustrating an example of processing of information processing server 4 according to the present embodiment. Note that, the flowchart illustrated in FIG. 3 indicates processing to data acquired from camera 2 and millimeter-wave radar 3 provided at one monitoring point. Information processing server 4 may simultaneously perform the processing illustrated in FIG. 3 to data acquired from camera 2 and millimeter-wave radar 3 provided at each monitoring point.

Data synchronizer 42 acquires image data from camera 2 (S101).

Data synchronizer 42 acquires millimeter-wave data from millimeter-wave radar 3 (S102).

Note that, the order of S101 and S102 is not limited thereto. Further, the processing of S101 is executed each time camera 2 transmits image data, and the processing of S102 is executed each time millimeter-wave radar 3 transmits millimeter-wave data.

Data synchronizer 42 performs data synchronization processing in which the image data and the millimeter-wave data are synchronized (S103).

Data synchronizer 42 performs data accumulation processing in which the synchronized data are accumulated in data accumulator 43 (S104).

Screen generator 44 performs clustering processing to the millimeter-wave data (S105).

The clustering processing is processing in which a plurality of reflection points included in millimeter-wave data and corresponding to one reflection object are grouped. Information on the reflection object, such as the size, shape, and color of the reflection object, may also be acquired by the grouping processing. Note that, a region including a group of a plurality of reflection points corresponding to one reflection object after the clustering processing will be described hereinafter as a reflection region.

Note that, in the clustering processing, screen generator 44 may also use millimeter-wave data before current millimeter-wave data, which is accumulated in data accumulator 43. By using the millimeter-wave data before the current millimeter-wave data and performing time-series processing, screen generator 44 may, for example, distinguish between a reflection point corresponding to a moving body and a reflection point corresponding to a stationary object.

Next, screen generator 44 performs data processing in accordance with a set mode (S106).

For example, in a case where the set mode is a mode in which a moving direction of a moving object is monitored (for example, a wrong-way traveling detection mode to be described later), screen generator 44 performs processing of tracking the moving object. For example, screen generator 44 performs processing in which a moving direction of a reflection region corresponding to the moving object is determined as an example of the tracking processing.

Further, for example, in a case where the set mode is a mode in which a type of a reflection object is identified (for example, an object identification mode to be described later), screen generator 44 identifies the type of the reflection object by using a reception intensity of a reflected signal, a size of a reflection region, and/or the like that are indicated by millimeter-wave data.

Further, for example, in a case where the set mode is a mode in which a retention condition of a reflection object is determined (for example, a heat map mode to be described later), screen generator 44 calculates the number of times (frequency) when the reflection object is detected in a scanning area for each partial range by using millimeter-wave data within a predetermined time accumulated in data accumulator 43.

Note that, the data processing in accordance with the set mode is not limited to the examples described above.

Next, screen generator 44 performs processing of generating a monitoring screen in which the image data and the millimeter-wave data have been associated with each other (S107).

For example, screen generator 44 performs processing of superimposing the millimeter-wave data on a camera image indicated by the image data. In this processing, screen generator 44 may perform coordinate conversion of millimeter-wave data information such that the camera coordinate system and the millimeter-wave radar coordinate system are aligned.

Screen generator 44 performs processing of transmitting data of the generated monitoring screen (S108).

Next, display examples of monitoring screens generated in information processing server 4 and displayed on the display of remote monitoring PC 5 will be described.

Display Example 1

Figure 4:
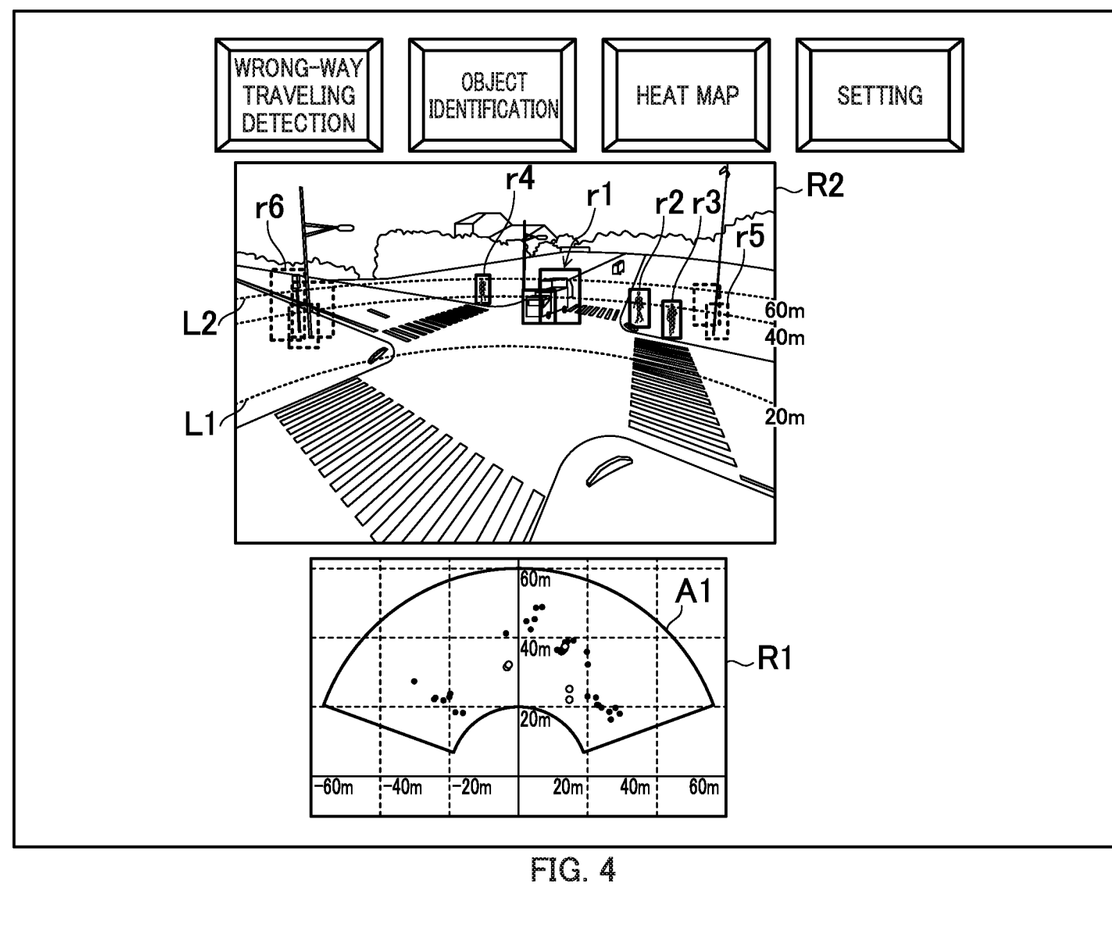
FIG. 4 illustrates display example 1 of a display screen in the embodiment of the present disclosure.

Display example 1 is an example of screens displayed on the display of remote monitoring PC 5 in a case where a user performing monitoring selects a monitoring point of an intersection through the operator of remote monitoring PC 5.

FIG. 4 illustrates display example 1 of a display screen in the present embodiment. Display example 1 illustrated in FIG. 4 includes a monitoring screen generated based on data acquired from camera 2 that is the monitoring point and is provided in an obliquely upward direction when viewed from a road surface of an intersection, and millimeter-wave radar 3 provided at substantially the same position as that of camera 2.

In an upper portion of FIG. 4, a "wrong-way traveling detection" button, an "object identification" button, a "heat map" button, and a "setting" button are illustrated. Each button is depressed by a user in a case where a setting related to the monitoring screen, for example, a mode related to the monitoring screen is set.

In a lower portion of FIG. 4, region R1 in which millimeter-wave data is displayed is illustrated. Further, an example of the monitoring screen is illustrated in region R2.

For example, region R1 indicates a plurality of grids delimited by a plurality of vertical lines and a plurality of horizontal lines in which a position of millimeter-wave radar 3 is used as a reference (origin). Further, region R1 indicates area A1 indicating a scanning area of millimeter-wave radar 3, and reflection points in area A1. Note that, the display of region R1 may be omitted as appropriate by a setting of a user, for example.

For example, on the monitoring screen of region R2, millimeter-wave data acquired by scanning by millimeter-wave radar 3 is superimposed on a camera image.

Note that, screen generator 44 may perform coordinate conversion processing in a case where the millimeter-wave data is superimposed on the camera image. For example, screen generator 44 converts area A1 and the reflection points in area A1, which are defined by the millimeter-wave radar coordinate system, into those in the camera coordinate system. On the monitoring screen of region R2, the millimeter-wave data converted to that of the coordinate system of the monitoring area of camera 2 is superimposed on the camera image.

For example, area A1 of region R1 defined by the millimeter-wave radar coordinate system corresponds to an area sandwiched by lines L1 and L2 on the monitoring screen of region R2 defined by the camera coordinate system.

Note that, the area sandwiched by lines L1 and L2 of region R2 indicates the scanning area of millimeter-wave radar 3 on the camera image. The area sandwiched by lines L1 and L2 may be indicated with a different aspect (for example, a different color) from the camera image such that the camera image is transmitted, for example. Further, the area sandwiched by lines L1 and L2 may be omitted as appropriate.

In the area sandwiched by lines L1 and L2 of region R2, frames r1 to r6 indicating reflection regions corresponding to reflection objects detected based on the millimeter-wave data are indicated. Thus, since the monitoring screen of region R2 indicates reflection regions corresponding to reflection objects by using frames on the camera image, the reflection objects present in the monitoring area and detected by millimeter-wave radar 3 can be visually confirmed by a user.

Further, frames r1 to r4 are indicated with a different aspect (for example, a different color) from that of frames r5 and r6. The aspects of frames vary depending on whether reflection objects detected by using millimeter wave data are moving objects or stationary objects. Changing the aspects of frames indicating reflection objects enables a user to visually confirm information on whether the reflection objects detected by millimeter-wave radar 3 are moving objects or stationary objects.

For example, frames r1 to r4 indicate each a moving object (a vehicle or a pedestrian), and frames r5 and r6 indicate each a stationary object (a structure provided on a roadside of the road).

Note that, the "wrong-way traveling detection" button, the "object identification" button, the "heat map" button, and the "setting" button in the upper portion of FIG. 4 correspond to a wrong-way traveling detection mode, an object identification mode, a heat map mode, and a setting mode, respectively. A user may operate the operator of remote monitoring PC 5 and depress any one of the buttons. In this case, remote monitoring PC 5 transmits to information processing server 4 that the mode corresponding to a depressed button has been set.

Next, a display example in a case where information processing server 4 changes the mode will be described.

Display Example 2

Figure 5:
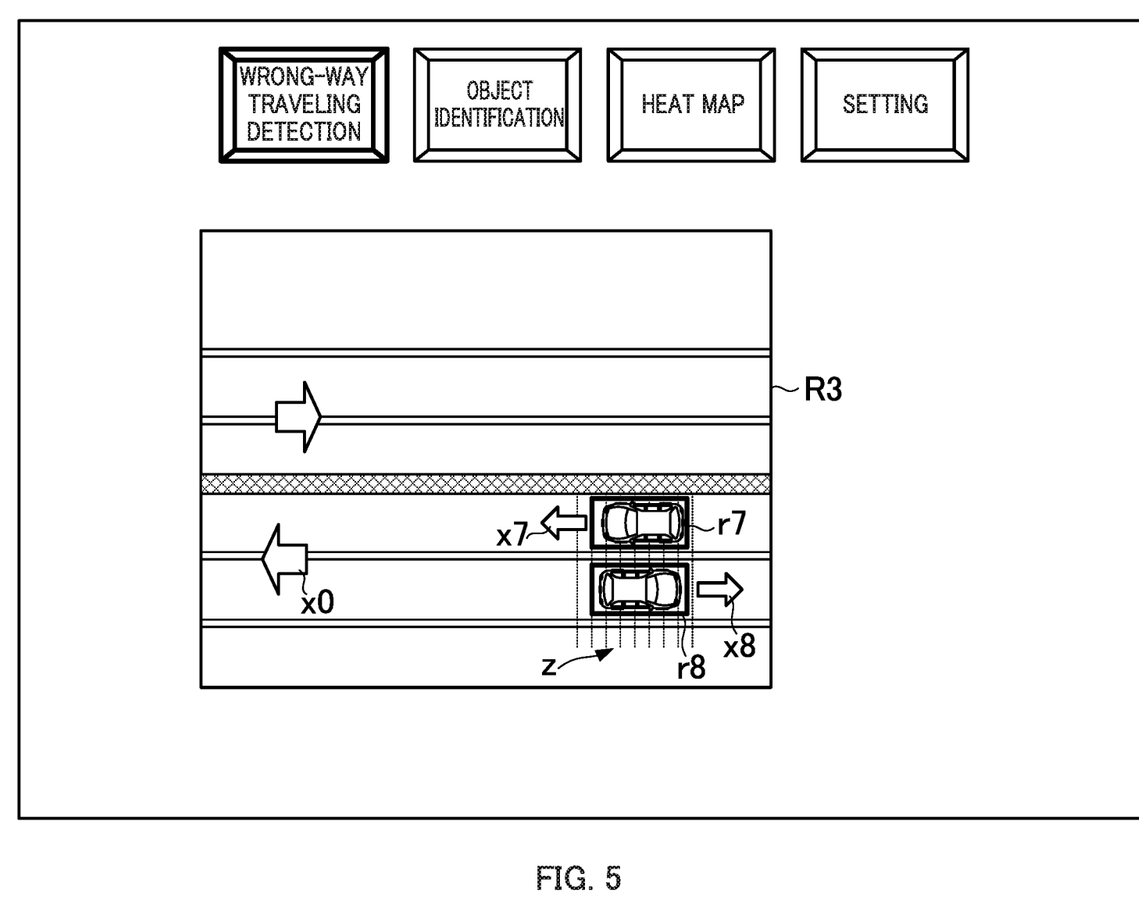
FIG. 5 illustrates display example 2 of the display screen in the embodiment of the present disclosure.

Display example 2 is an example of a screen displayed on the display of remote monitoring PC 5 in a case where the user performing monitoring depresses the "wrong-way traveling detection" button through the operator of remote monitoring PC 5 and the wrong-way traveling detection mode is set.

FIG. 5 illustrates display example 2 of the display screen in the present embodiment. Display example 2 illustrated in FIG. 5 includes a monitoring screen generated based on data acquired from camera 2 that is the monitoring point and is provided in an upward direction of a road surface of a road having a total of four lanes, with two lanes on each side, and millimeter-wave radar 3 provided at substantially the same position as that of camera 2.

In an upper portion of FIG. 5, the "wrong-way traveling detection" button, the "object identification" button, the "heat map" button, and the "setting" button are illustrated. Since the wrong-way traveling detection mode is set in FIG. 5, FIG. 5 is in a state in which the "wrong-way traveling detection" button is depressed.

Region R3 is a monitor screen displayed in a case where the wrong-way traveling detection mode is set. In region R3, millimeter-wave data is superimposed on a camera image.

Note that, as in the example of FIG. 4, screen generator 44 may perform coordinate conversion processing in a case where the millimeter-wave data is superimposed on the camera image. Further, in a case where the wrong-way traveling detection mode is set, screen generator 44 performs processing in which wrong-way traveling of a moving object (for example, a vehicle) is detected.

For example, in the processing of detecting wrong-way traveling, screen generator 44 detects a moving object present in a scanning area by using millimeter-wave data. Screen generator 44 then detects a moving direction of the detected moving object. A method for detecting of a moving direction of a moving body may be, for example, a method using a Doppler shift or a method in which a position of the moving body at a current point in time is compared with that at a point in time before the current point in time. A position of a moving object at a point in time before a current point in time may be detected, for example, by using past millimeter-wave data accumulated in data accumulator 43.

Screen generator 44 may also superimpose frames (frames r7 and r8 in FIG. 5) indicating positions of detected moving objects and arrows (arrows x7 and x8 in FIG. 5) indicating moving directions of the detected moving objects on the camera image. The frames indicating the positions of the detected moving objects and the arrows indicating the moving directions of the detected moving objects represent an example of millimeter-wave data information.

Screen generator 44 then determines whether or not the moving directions of the detected moving objects are different from a traveling direction (hereinafter, referred to as a forward direction) defined for the road included in the monitoring area.

Note that, basically, when positions and orientations of camera 2 and millimeter-wave radar 3 are determined and a monitoring area (and a scanning area) is determined, the forward direction is uniquely determined. Accordingly, the forward direction may be set in advance, for example, in accordance with positions where camera 2 and millimeter-wave radar 3 are installed and orientations thereof. Alternatively, screen generator 44 may also determine the forward direction by monitoring moving directions of a plurality of moving objects passing through a monitoring area for a predetermined time.

Note that, FIG. 5 illustrates arrow x0 indicating the forward direction for convenience of description.

In a case where a moving direction of a detected moving object is different from the forward direction, screen generator 44 determines that the detected moving object travels in the wrong direction.

For example, in FIG. 5, arrow x7 of a moving body surrounded by frame r7 is the same direction as arrow x0 that is the forward direction. Accordingly, it is determined that the moving body surrounded by frame r7 does not travel in the wrong direction. On the other hand, arrow x8 of a moving body surrounded by frame r8 is a direction opposite to arrow x0 that is the forward direction. Accordingly, it is determined that the moving body surrounded by frame r8 travels in the wrong direction.

Note that, in a case where it is determined whether or not wrong-way traveling occurs, screen generator 44 may define scales z finely sectioning the road as illustrated in FIG. 5, and determine the moving direction in each scale z. Determining the moving direction in a plurality of scales makes it possible to restrain a determination error.

In a case where a moving object traveling in the wrong direction is detected, screen generator 44 transmits alarm information indicating that the moving object traveling in the wrong direction has been detected.

Remote monitoring PC 5 that receives the alarm information notifies the display of an alarm. An alarm notification method may be, for example, a method using symbols and/or character information or a method in which at least some colors of the display are changed. Alternatively, remote monitoring PC 5 may notify the alarm by using audio.

Note that, screen generator 44 may capture a moving body traveling in the wrong direction and determine a wrong-way traveling situation of the moving body by using millimeter-wave data before current millimeter-wave data. Then, screen generator 44 may add information indicating the wrong-way traveling situation of the moving body to the alarm information. The wrong-way traveling situation of the moving body represents, for example, whether or not the wrong-way traveling is intentional or whether or not the wrong-way traveling is caused by an operational error by the driver.

For example, in a case where a moving object continues wrong-way traveling for a relatively long time, screen generator 44 determines that the wrong-way traveling is intentional. Alternatively, in a case where a moving object suddenly reverses the traveling direction, that is, performs a so-called U-turn, screen generator 44 determines that the wrong-way traveling is intentional. Alternatively, in a case where a moving object temporarily travels in the wrong direction and then changes the traveling direction to the forward direction, screen generator 44 determines that the wrong-way traveling is caused by an operational error (for example, "inadvertence") by the driver.

For example, a situation is assumed in which, in a case where a vehicle that has entered a rest facility such as a service area and a parking area on an expressway merges into a main lane on the expressway, the vehicle travels in the wrong direction due to an inadvertent operation by the driver, the driver notices the wrong-way traveling on the way, and changes the direction to the forward direction. Such a situation may be determined as a temporary wrong-way traveling. Note that, there may also be a situation in which a driver is unconscious and continues wrong-way traveling without noticing it. Such a situation may be determined as intentional wrong-way traveling.

Remote monitoring PC5 that has received alarm information may change an alarm to be notified to the display in accordance with information indicating a wrong-way traveling situation of a moving body. Note that, in a case where wrong-way traveling is determined on the monitoring screen, screen generator 44 may perform a highlighted display, for example, changing at least one of the thickness, type, color tone, brightness, and contrast of the frame line of frame r8, or blinking and displaying frame r8.

Further, information processing server 4 may be provided with an alarm controller that controls an external equipment and issues an alarm to a moving object traveling in the wrong direction and/or a periphery of the moving object traveling in the wrong direction based on alarm information acquired from screen generator 44.

The alarm controller is provided, for example, on a periphery of a monitoring point, controls at least one of an alarm lamp, a light emitting diode (LED) lighting pole, and a display board (guide board) that are connected to network N1, and issues an alarm to the periphery of the monitoring point that there is a moving object traveling in the wrong direction. For example, the alarm controller controls the color, brightness, and interval between lighting and lighting-out of the alarm lamp and/or the LED lighting pole, and notifies the periphery of the monitoring point of an abnormality.

Thus, by superimposing a result of detecting wrong-way traveling by using millimeter-wave data on a camera image, the wrong-way traveling detection mode makes it possible to detect wrong-way traveling whose detection may be delayed with a camera image, and to assist traffic monitoring by a user's vision efficiently.

Display Example 3

Figure 6:
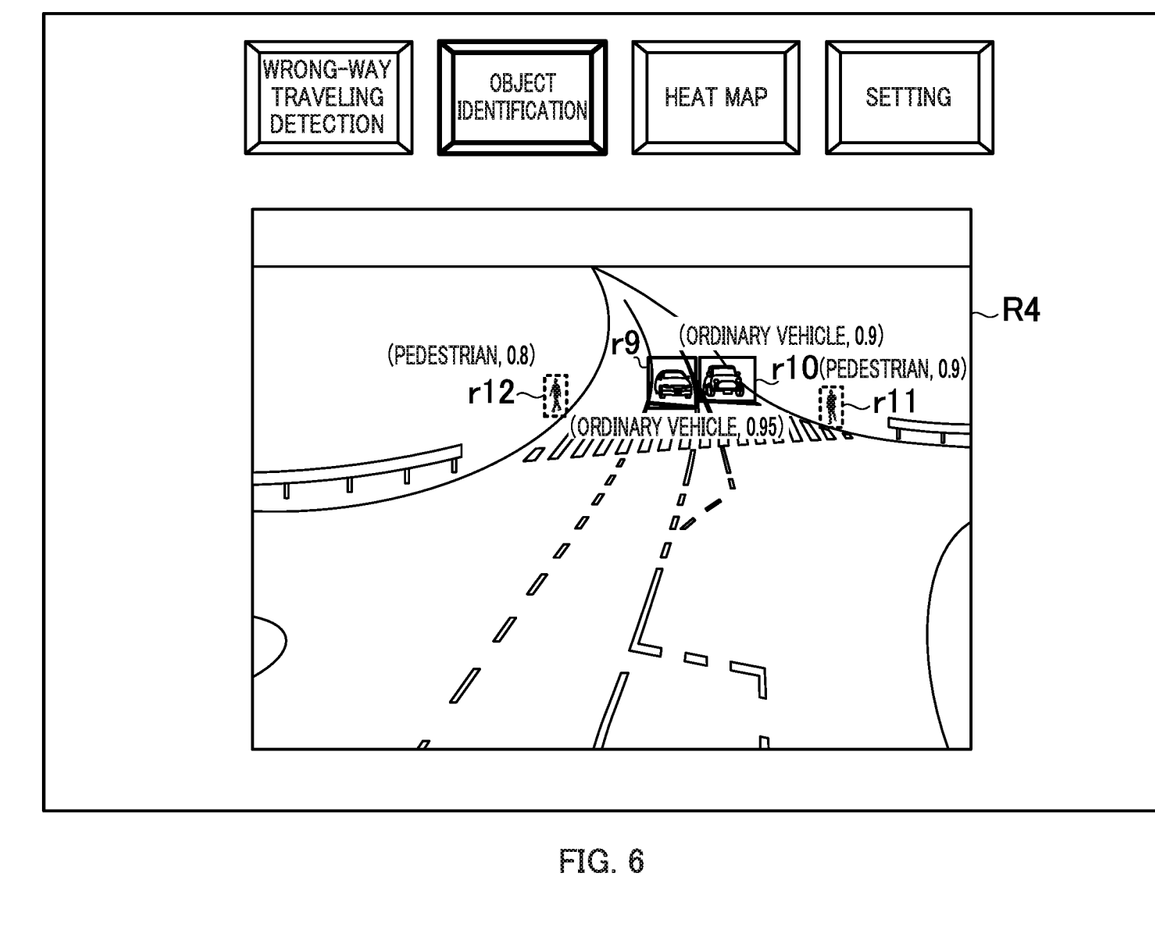
FIG. 6 illustrates display example 3 of the display screen in the embodiment of the present disclosure.

Display example 3 is an example of a screen displayed on the display of remote monitoring PC 5 in a case where the user performing monitoring depresses the "object identification" button through the operator of remote monitoring PC 5 and the object identification mode is set.

FIG. 6 illustrates display example 3 of the display screen in the present embodiment. Display example 3 illustrated in FIG. 6 includes a monitoring screen generated based on data acquired from camera 2 that is the monitoring point and is provided in an obliquely upward direction when viewed from a road surface of an intersection, and millimeter-wave radar 3 provided at substantially the same position as that of camera 2.

In an upper portion of FIG. 6, the "wrong-way traveling detection" button, the "object identification" button, the "heat map" button, and the "setting" button are illustrated.

Since the object identification mode is set in FIG. 6, FIG. 6 is in a state in which the "object identification" button is depressed.

Region R4 is a monitoring screen set to the object identification mode. In region R4, millimeter-wave data is superimposed on a camera image.

Note that, as in the example of FIG. 4, screen generator 44 may perform coordinate conversion processing in a case where the millimeter-wave data is superimposed on the camera image. Further, in a case where the object identification mode is set, screen generator 44 performs processing in which an object detected in the millimeter-wave data is identified.

For example, screen generator 44 detects an object present in the monitoring area by using millimeter-wave data. The object to be detected may be a moving object or a stationary object. Screen generator 44 then detects a feature whereby the detected object is identified. The feature whereby an object is identified may be, for example, at least one of the type (for example, extra-large vehicle, large vehicle, ordinary vehicle, two-wheeler and person), size (for example, width and height), color, and shape of the object.

A method for detecting a feature of an object may be, for example, a publicly-known method based on information on at least of a reception intensity of a reflected signal and a Doppler frequency of a reflected signal, or other information.

Screen generator 44 may superimpose a frame indicating a position of a detected object and information indicating a feature of the detected object on the camera image. For example, it is possible to identify the type of person, bicycle, bike, ordinary vehicle, large vehicle or the like as a moving object.

The information indicating a feature of an object may be, for example, character information. Alternatively, a feature of an object may be indicated by changing the type and/or color of a frame indicating a position of the object depending on the feature of the object.

Further, information indicating probability (reliability) of a feature for each type of an object may also be superimposed.

For example, in FIG. 6, frames r9 and r10 indicating positions of detected vehicles are indicated with a different aspect (for example, a different color) from that of frames r11 and r12 indicating positions of detected pedestrians. It is then indicated with character information that the type of the vehicle indicated by frame r9 is "ordinary vehicle". In addition, it is indicated with character information that the probability of those features is "0.95". This numerical value indicates, for example, that a reflection object indicated by frame r9 is an ordinary vehicle with 95% reliability.

Thus, by superimposing information on an identification result indicating a feature of an object detected by using millimeter-wave data on a camera image, the object identification mode enables a user to confirm the feature of the object, which is difficult to confirm with the camera image, and to monitor traffic monitoring visually. For example, it is possible to confirm a feature of an object even in a case where a camera image is not clear due to weather and/or date and time. Note that, in a situation in which weather or the like does not affect, information such as black and white may also be added as color information on an object by using an analysis result of a camera image as illustrated in FIG. 6.

Display Example 4

Figure 7:
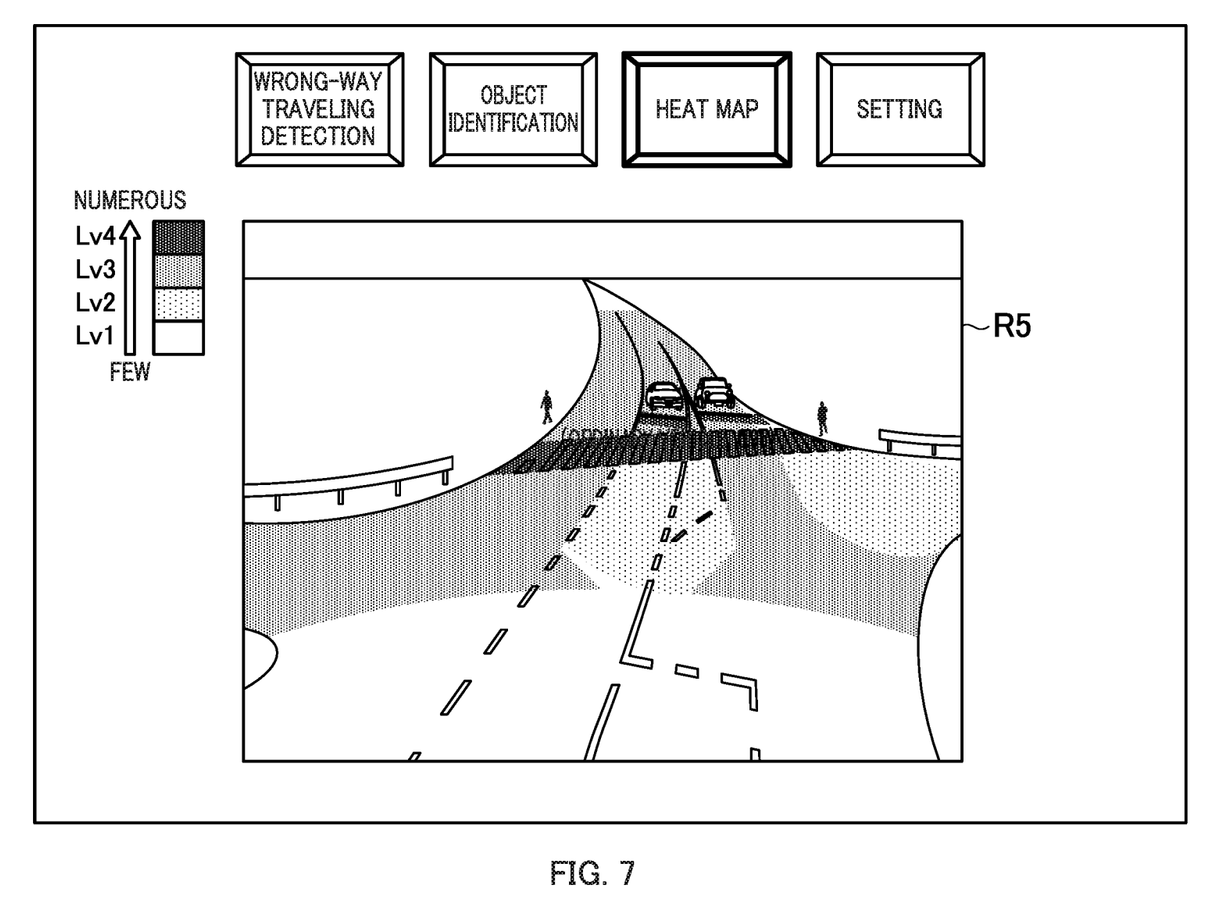
FIG. 7 illustrates display example 4 of the display screen in the embodiment of the present disclosure.

Display example 4 is an example of a screen displayed on the display of remote monitoring PC 5 in a case where the user performing monitoring depresses the "heat map" button through the operator of remote monitoring PC 5 and the heat map mode is set.

FIG. 7 illustrates display example 4 of the display screen in the present embodiment. Display example 4 illustrated in FIG. 7 includes a monitoring screen generated based on data acquired from camera 2 that is the monitoring point and is provided in an obliquely upward direction when viewed from a road surface of an intersection, and millimeter-wave radar 3 provided at substantially the same position as that of camera 2.

In an upper portion of FIG. 7, the "wrong-way traveling detection" button, the "object identification" button, the "heat map" button, and the "setting" button are illustrated. Since the heat map mode is set in FIG. 7, FIG. 7 is in a state in which the "heat map" button is depressed.

Region R5 is a monitor screen set to the heat map mode. In region R5, millimeter-wave data is superimposed on a camera image.

Note that, as in the example of FIG. 4, screen generator 44 may perform coordinate conversion processing in a case where the millimeter-wave data is superimposed on the camera image. Further, in a case where the heat map mode is set, screen generator 44 performs processing in which a retention condition of an object is determined by using millimeter-wave data before current millimeter-wave data and heat map information indicating the retention condition is generated.

For example, by using millimeter-wave data acquired at a predetermined time before a current point in time, screen generator 44 counts the number of reflection objects detected at a predetermined time in each of detection rectangular frames obtained by dividing a monitoring area into a plurality of grids. Screen generator 44 then classifies the detection rectangular frames in accordance with the number of detected reflection objects. At this time, the detection rectangular frames may also be classified in accordance with the type (for example, vehicle or pedestrian) and number of the detected reflection objects.

Then, screen generator 44 may also superimpose the heat map information indicating the classified detection rectangular frames on the camera image.

The heat map information on the indicating the classified detection rectangular frames is, for example, a difference in aspect such as a color difference. For example, screen generator 44 may superimpose colors corresponding to the number of detected reflection objects with an aspect of making the colors transparent on the camera image.

For example, FIG. 7 illustrates information indicating detection rectangular frames classified in accordance with the number of detected reflection objects with four color differences of "Lv1" to "Lv4". For example, regions of Lv2 to Lv4 in FIG. 7 correspond to regions of a roadway. Further, a region of Lv4 falls under a region corresponding to a crosswalk where a frequency at which both vehicles and pedestrians pass is high, or a region corresponding to a stop line where the number of vehicle stops is high. Further, a comparison between the regions of Lv4 and Lv3 and the region of Lv2 clarifies that the intersection at the monitoring point is an intersection where left turns are few.

Thus, superimposing heat map information on a camera image makes it possible to estimate a road structure (for example, the number of lanes, the lane type (for example, right-turn dedicated lane), and the lane shape) at a monitoring point. For example, it is possible to estimate that a region where the number of vehicle detections is high is a roadway, that a region where the number of pedestrian detections is high is a sidewalk, and that a region where the number of both vehicle and pedestrian detections is high is a crosswalk. Further, it is possible to estimate that, in a region of a roadway, a position where the number of vehicle detections is relatively high is a periphery of a stop line.

Thereby, a road structure of a monitoring area can be accurately estimated. Accordingly, it is possible to perform a display with high visual effect on a user.

Further, since a road structure of a monitoring area can be accurately estimated, it is possible to accurately predict a situation such as running-out of a pedestrian and/or a vehicle and a two-wheeler's slipping-through, and to issue an effective alarm at a monitoring point.

Further, since a road structure of a monitoring area can be accurately estimated, it is possible to reduce labor for setting a road structure when camera 2 and millimeter-wave radar 3 are installed, so that the setting can be simplified.

Note that, display examples 2 to 4 (FIGS. 5 to 7) described above have indicated examples in which one monitoring screen is displayed. The present disclosure is not limited thereto. For example, millimeter-wave data acquirable by scanning by millimeter-wave radar 3 may be displayed in FIGS. 5 to 7 as in region R1 of FIG. 4.

Display Example 5

Figure 8:
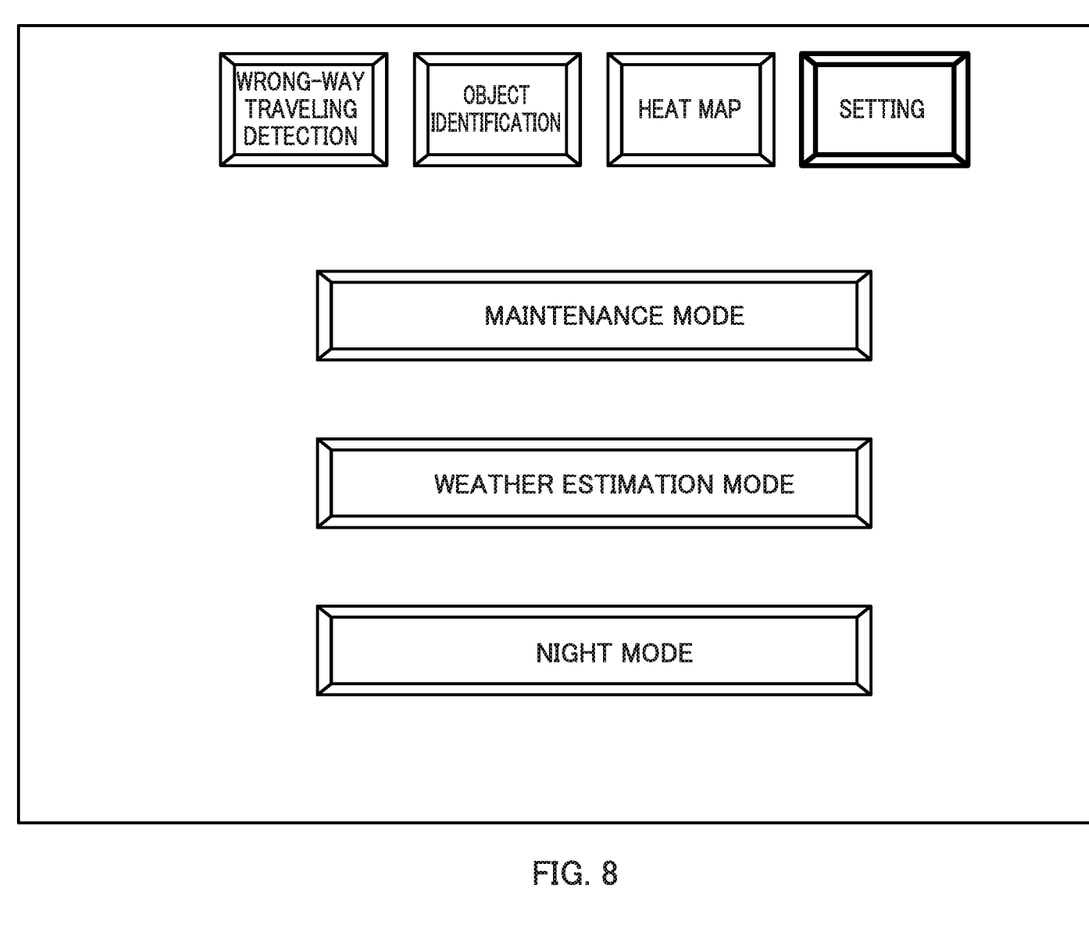
FIG. 8 illustrates display example 5 of the display screen in the embodiment of the present disclosure.

Display example 5 is an example of a screen displayed on the display of remote monitoring PC 5 in a case where the user performing monitoring depresses the "setting" button through the operator of remote monitoring PC 5 and the setting mode is set.

FIG. 8 illustrates display example 5 of the display screen in the present embodiment. In an upper portion of FIG. 8, the "wrong-way traveling detection" button, the "object identification" button, the "heat map" button, and the "setting" button are illustrated. Since the setting mode is set in FIG. 8, FIG. 8 is in a state in which the "setting" button is depressed.

Further, buttons of "maintenance mode", "weather estimation mode", and "night mode" that can be set in the setting mode are displayed on the display screen of FIG. 8. The user performing monitoring depresses a displayed button, and selects a different mode. Hereinafter, each mode will be described.

"Maintenance Mode"

In the maintenance mode, a monitoring point is selected, and thereby information processing server 4 performs a fixed point observation of camera 2 and/or millimeter-wave radar 3 provided at the monitoring point. In a case where an abnormality of the monitoring point is detected by the fixed point observation, information processing server 4 adjusts parameters of camera 2 (for example, the viewing angle, resolution, and exposure of camera 2) and/or parameters of millimeter-wave radar 3 (for example, resolution, transmission output, and reception sensitivity). In a case where an abnormality is detected even when the parameter adjustment is repeated, information processing server 4 notifies remote monitoring PC 5 of information informing the abnormality. Remote monitoring PC 5 that has received the notification displays the information informing the abnormality on the display.

"Weather Estimation Mode"

In the weather estimation mode, information processing server 4 estimates weather by using millimeter-wave data. For example, information processing server 4 may detect attenuation of a reception intensity of a reflected signal and/or a variation in a Doppler frequency of a reflected signal indicated by the millimeter-wave data in accordance with the difference in weather, and estimate weather based on a detected amount.

"Night Mode"

In the nighttime mode, information processing server 4 does not superimpose millimeter-wave data on a camera image, but mainly displays a display based on millimeter-wave data. Thus, in a case where an image captured by camera 2 at night or the like is not clear and an object is difficult to identify, it is possible to avoid a display that is rather difficult to see when superimposition is performed.

Note that, the modes that can be set in the setting mode may include modes indicating the following examples.

"Traffic Flow Count Mode"

In the traffic flow count mode, by using millimeter-wave data acquired at a predetermined time before a current point in time, screen generator 44 counts the number of vehicles detected at a predetermined time in each of detection rectangular frames obtained by dividing a monitoring area into a plurality of grids. Screen generator 44 then generates information on traffic flow in accordance with the number of detected objects, and superimposes the information on a camera image.

For example, in the traffic flow count mode, screen generator 44 statistically calculates information such as vehicle-to-vehicle distances, speeds, and vehicular lengths in accordance with the number of detected vehicles. Screen generator 44 then estimates a degree of congestion in a monitoring area.

Note that, screen generator 44 may also perform the estimation for each time zone and/or for each date. The time zones and/or dates for which the estimation is performed may be designated by a user through remote monitoring PC5.

Further, screen generator 44 may also estimate a degree of congestion for each type of detected objects. For example, screen generator 44 may estimate a degree of congestion for each type of vehicles, such as ordinary vehicle, large vehicle, and two-wheeler.

"Intersection Monitoring Mode"

In the intersection monitoring mode, information processing server 4 detects an event likely to occur at an intersection by using camera 2 and millimeter-wave radar 3 provided on a periphery of the intersection, and issues an alarm in accordance with a detection result.

For example, to prevent a collision when a vehicle turns left, information processing server 4 confirms, in a case where a vehicle turning left is detected, whether or not there is a moving object (for example, a two-wheeler) on a periphery of the vehicle turning left. In a case where there is a moving object on the periphery of the vehicle turning left, information processing server 4 then issues an alarm (for example, an alarm against running-out) to the two-wheeler and a periphery thereof.

Further, for example, to detect a two-wheeler's slipping-through, information processing server 4 prioritizes and detects a two-wheeler by using millimeter-wave data. Information processing server 4 then tracks a travel path of the detected two-wheeler. In a case where the two-wheeler slips through between ordinary vehicles or the like, information processing server 4 issues an alarm (for example, an alarm against running-out) to the two-wheeler and a periphery thereof.

"Animal Detection Mode"

In the animal detection mode, information processing server 4 detects whether or not there is an animal on a road or on a periphery of the road based on millimeter-wave data.

For example, information processing server 4 extracts information peculiar to a case where an animal is a reflection object from reflected signal information included in millimeter-wave data, and detects whether or not there is an animal.

Note that, in the present embodiment, a traffic monitoring system in which traffic of a road where vehicles, pedestrians, or the like pass is monitored has been described as an example. The present disclosure is not limited thereto. For example, it may be a traffic monitoring system in which railways and railway users are monitored. For example, in a traffic monitoring system in which railway traffic is monitored, camera 2 and millimeter-wave radar 3 may be provided at locations looking over a platform and a track and/or locations closer to a track below a platform than to the platform. Further, in the traffic monitoring system in which railway traffic is monitored, a "fall detection mode" or the like may be included in settable modes.

"Fall Detection Mode"

In the fall detection mode, in a case where camera 2 and/or millimeter-wave radar 3 provided above a platform (hereinafter, referred to as "camera/radar on platform") detect that a person walking on the platform or an article (a portable article such as an umbrella or a purse) falls below the platform, camera 2 and/or millimeter-wave radar 3 provided below the platform (hereinafter, referred to as "camera/radar below platform") start detecting. Then, data of the camera/radar on platform and data of the camera/radar below platform after a point in time when the fall below the platform is detected are stored in association with each other.

Further, in a case where the radar below platform does not detect a moving object, the camera below platform may extract a stationary object.

As described above, in the present embodiment, a traffic monitoring system has been described which includes an information processing server that synchronizes image data captured by a camera and millimeter-wave data acquired by a millimeter-wave radar, associates the image data and the millimeter-wave data which have been synchronized with each other, and generates a monitoring screen indicating road conditions. According to the present embodiment, the data acquirable from two sensor devices, that is, a camera and a millimeter-wave radar, are synchronized, and a monitoring screen in which the synchronized data are associated with each other is generated, so that road conditions can be monitored accurately and efficiently.

For example, a camera image acquirable from data of a camera can provide a user performing monitoring with visually effective information, and data of a millimeter-wave radar can provide the user performing monitoring with detailed information that cannot be acquired from the camera image. Accordingly, the present embodiment makes it possible to monitor road conditions accurately and efficiently by associating the detailed information acquirable from the millimeter-wave radar with the camera image.

Various embodiments have been described above with reference to the drawings. However, it goes without saying that the present disclosure is not limited to these embodiments. It is obvious that one of ordinary skill in the art can conceive various modified examples and correction examples within the scope recited in the claims. It should be naturally understood that these modified examples and correction examples belong to the technical scope of the present disclosure. Furthermore, each component of the above embodiments may be optionally combined without departing from the gist of the disclosure.

Although examples of configuring the present disclosure by using hardware have been described in each embodiment described above, the present disclosure can also be realized by software in cooperation with hardware.

Each functional block used in the description of the each embodiment described above is realized by an LSI such as an integrated circuit typically. The integrated circuit may control each functional block used in the description of the each embodiment described above, and may include an input and an output. The functional block may be provided as an individual chip, or a part or all of the functional blocks may be provided as integrated in a single chip. Reference to the LSI is made here, but the LSI may be referred to as an IC, a system LSI, a super LSI, or an ultra LSI depending on a difference in the degree of integration.

Further, the technique of implementing an integrated circuit is not limited to the LSI and may be realized by using a dedicated circuit or a general-purpose processor. A field programmable gate array (FPGA) that can be programmed after the manufacture of the LSI or a reconfigurable processor in which the connections and the settings of circuit cells disposed inside the LSI can be reconfigured may be used.

If future integrated circuit technology replaces LSIs as a result of the advancement of semiconductor technology or other derivative technology, the functional blocks could be integrated using another future integrated circuit technology. Biotechnology can also be applied.

It should be noted that the present disclosure can be represented as a control method performed in a radio communication apparatus or a control apparatus. Further, the present disclosure can also be represented as a program for causing the control method to be operated with a computer. In addition, the present disclosure can be also represented as a recording medium where the program is recorded so as to be readable by a computer. That is, the present disclosure may be represented in any category of devices, methods, programs, and recording media.

It should also be noted that the present disclosure is not limited to the each embodiment described above in terms of e.g. the type, arrangement, number of members, and alterations can be made as appropriate without departing from the scope of the present invention by, for example, appropriately substituting the components with those having equivalent operational effects.

The disclosure of Japanese Patent Application No. 2018-072542, filed on Apr. 4, 2018, including the specification, drawings and abstract, is incorporated herein by reference in its entirety.

INDUSTRIAL APPLICABILITY

The present disclosure is suitable for use in traffic monitoring.

REFERENCE SIGNS LIST

1 Traffic monitoring system
2 Camera
3 Millimeter-wave radar
4 Information processing server (control apparatus)
5 Remote monitoring PC
41 Communicator
42 Data synchronizer
43 Data accumulator
44 Screen generator
45 Mode setter

The invention claimed is:

1. A traffic monitoring system, comprising:
a camera that captures a monitoring area including a road, and generates image data;
a millimeter-wave radar that scans a scanning area included in the monitoring area, and generates millimeter-wave data; and
an information processing server that is connected to the camera and the millimeter-wave radar, and acquires the image data and the millimeter-wave data, wherein
the information processing server includes:
a data synchronizer that synchronizes the image data and the millimeter-wave data such that a difference between a first timing at which the image data is generated and a second timing at which the millimeter-wave data is generated is equal to or smaller than a certain value; and
a screen generator that associates the image data and the millimeter-wave data which have been synchronized, with each other, and generates a monitoring screen that indicates a condition of the road,
the screen generator determines a retention condition of an object in the scanning area based on the millimeter-wave data, and superimposes information indicating the retention condition on the image data,
the information indicating the retention condition is color information in accordance with a detection frequency of the object, and
the screen generator superimposes the color information on the image data while making the color information transparent on the image data.

2. The traffic monitoring system according to claim 1, further comprising:
a data accumulator that accumulates the image data and the millimeter-wave data which have been synchronized by the data synchronizer, wherein
the screen generator generates the monitoring screen by using the image data and the millimeter-wave data accumulated in the data accumulator, the image data being past image data, the millimeter-wave data being past millimeter-wave data.

3. The traffic monitoring system according to claim 1, wherein
the screen generator performs conversion such that millimeter-wave data corresponding to the scanning area corresponds to the monitoring area.

4. A traffic monitoring method, comprising:
acquiring image data from a camera, the image data being generated by capturing a monitoring area including a road;
acquiring millimeter-wave data from a millimeter-wave radar, the millimeter-wave data being generated by scanning a scanning area included in the monitoring area;
synchronizing the image data and the millimeter-wave data such that a difference between a first timing at which the image data is generated and a second timing at which the millimeter-wave data is generated is equal to or smaller than a certain value;
associating the image data and the millimeter-wave data which have been synchronized, with each other, and generating a monitoring screen that indicates a condition of the road;
determining a retention condition of an object in the scanning area based on the millimeter-wave data; and
superimposing information indicating the retention condition on the image data,
wherein the information indicating the retention condition is color information in accordance with a detection frequency of the object, and
the color information is superimposed on the image data while making the color information transparent on the image data.

5. A traffic monitoring system, comprising:
a camera that captures a monitoring area including a road, and generates image data;
a millimeter-wave radar that scans a scanning area included in the monitoring area, and generates millimeter-wave data; and
an information processing server that is connected to the camera and the millimeter-wave radar, and acquires the image data and the millimeter-wave data, wherein
the information processing server:
synchronizes the image data and the millimeter-wave data such that a difference between a first timing at which the image data is generated and a second timing at which the millimeter-wave data is generated is equal to or smaller than a certain value;
associates the image data and the millimeter-wave data which have been synchronized, with each other, and generates a monitoring screen that indicates a condition of the road; and
determines a retention condition of an object in the scanning area based on the millimeter-wave data, and superimposes information indicating the retention condition on the image data,
the information indicating the retention condition is color information in accordance with a detection frequency of the object, and
the information processing server superimposes the color information on the image data while making the color information transparent on the image data.

* * * * *